(No Model.)
W. B. ROGERS.
UNDERGROUND CONDUIT FOR ELECTRICAL CONDUCTORS.
No. 323,964. Patented Aug. 11, 1885.
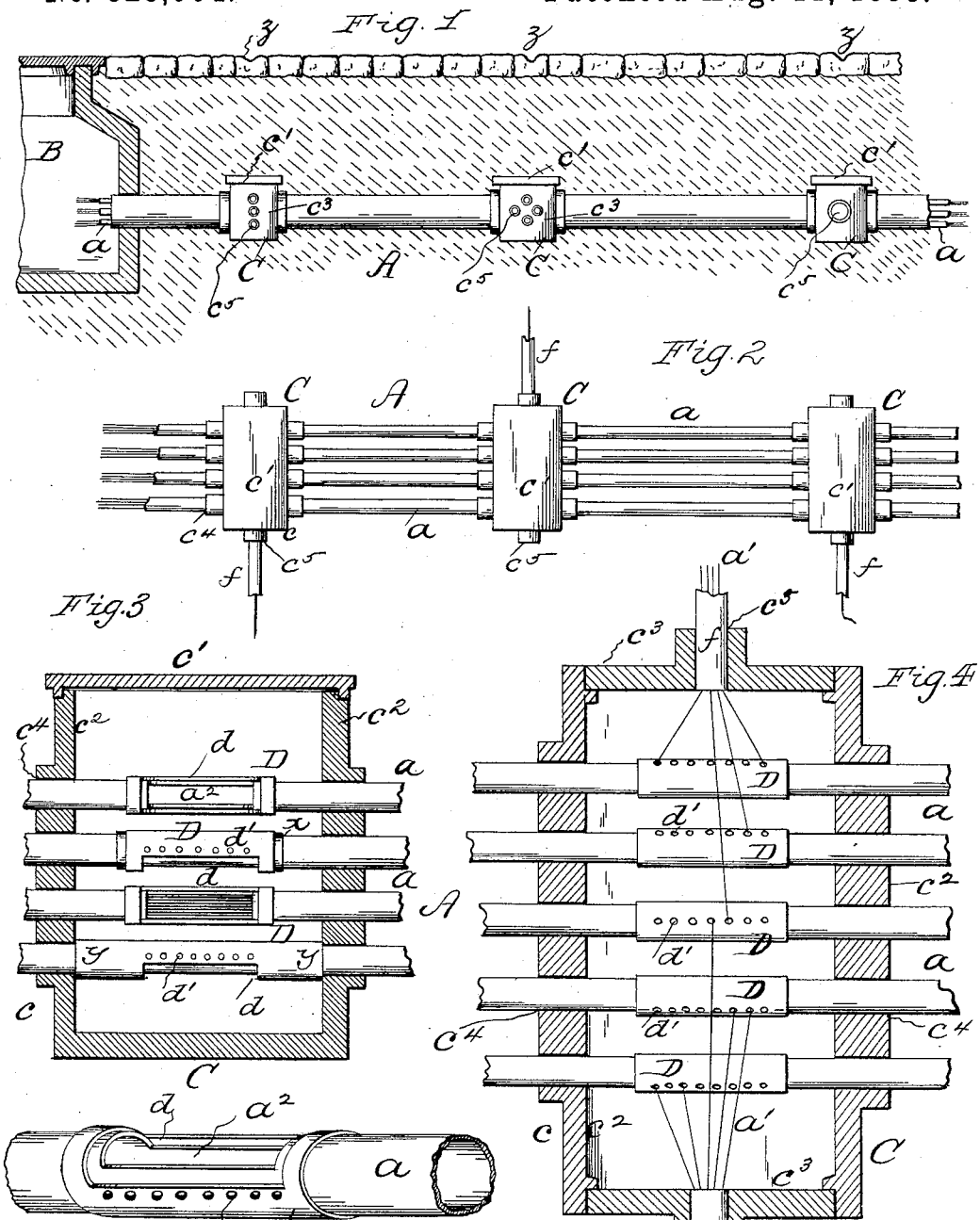

UNITED STATES PATENT OFFICE.

WILLIAM B. ROGERS, OF PHILADELPHIA, PENNSYLVANIA.

UNDERGROUND CONDUIT FOR ELECTRICAL CONDUCTORS.

SPECIFICATION forming part of Letters Patent No. 323,964, dated August 11, 1885.

Application filed September 27, 1884. (No model.)

*To all whom it may concern:*

Be it known that I, WILLIAM B. ROGERS, a citizen of the United States, residing at Philadelphia, in the county of Philadelphia and State of Pennsylvania, have invented certain new and useful Improvements in Underground Conduits for Electric Conductors, of which the following is a specification, reference being had therein to the accompanying drawings, wherein—

Figure 1 is a section of a line of underground conduit for electrical conductors embodying my improvements. Fig. 2 is a plan of modification of same. Fig. 3 is a vertical longitudinal section of a tapping-box, drawn to an enlarged scale. Fig. 4 is a horizontal section of same, and Fig. 5 is a broken perspective of a conductor-pipe and its movable sleeve.

My invention has relation, generally, to underground conduits for electrical conductors, but has particular reference to conduits of that form wherein the conductors are passed through tubes or pipes and the latter inclosed or surrounded by the conduit, and it has for its object to provide the conduit at suitable intervals along its line of way or between its man-holes with tapping-boxes, whereby lateral branches or conductors are readily and economically run out from the main line-conductors to houses, stores, or other places, for establishing lateral or branch electric circuits for illuminating, telephonic, or other purposes.

My invention accordingly consists of the combination, construction, and arrangement of parts comprising an underground conduit for electric conductors, as hereinafter described and claimed, having special reference to tapping-boxes having removable caps or covers, and through which pass the tubes containing the line-conductors, which tubes have partial transverse cuts or open sections within the boxes, covered by transversely moving or rotating sleeves provided with one or more lateral openings for the passage of the branch conductors connected to or tapped from the main line-conductors.

In the drawings, A represents a line of underground conduit for electrical conductors, and which is provided with the usual man-holes or testing-stations, B, at intervals along its length, which stations or man-holes may be of any desired or suitable construction.

The line-conduits may be of any of the well-known forms, or constructed and arranged as desired; but I prefer that construction of same wherein the conductors are inclosed in pipes $a$ and the latter surrounded by the casing or conduit, as shown in Fig. 1; or the pipes $a$ may form the conduits, as indicated in Fig. 2.

C C represent the tapping-boxes located at intervals along the line of way of the conduit A between the man-holes B. These tapping-boxes C are arranged transversely to the line of the conduit A, and connected with or joined to the latter to form part of the same. Any number of the boxes C may be used between two stations or points. These boxes C may be oblong in outline or of any other suitable or desired shape, and be made of cast-iron, wood suitably treated to prevent decay, manufactured or artificial stone, terra-cotta, metal, or other suitable material. They may be cast or formed in one piece or body, $c$, and have a removable lid, $c'$, as shown more plainly in Fig. 3, or the body $c$ may be composed of separate sides or pieces, (see Fig. 4,) and cemented or otherwise secured together to be water or air tight. The end and side walls, $c^2$ and $c^3$, of boxes C are respectively provided with openings $c^4$ and $c^5$, the former being for the passage of the line-conductor pipes $a$, and the latter for the lateral or tapped wires or conductors $a'$.

The openings $c^5$ may be arranged in clusters or otherwise, as shown in Fig. 1.

The boxes C are buried or covered up in the ground as the conduit is laid, and the location of each box is suitably marked by an indented stone, (indicated at $z$, Fig. 1,) or otherwise measured from the testing or connecting stations, so that the exact distance thereof can be ascertained as desired, in order to preserve the exact location and provide for easily finding the same when necessary to dig to and obtain access thereto for tapping purposes.

Any form of removable lid $c'$ for sealing the boxes C in any well-known manner may be used to keep the latter moisture-proof or air-tight.

Any desired way of tapping the boxes C or the main line conductors may be emp'oyed; but I prefer to partially cut away each pipe $a$ or provide it with an open transverse section, as shown at $a^2$, (see Figs. 3 and 5,) within the boxes C, and to surround such open section with a partial sleeve, D, or one having a cut-away portion or open section, $d$.

The sleeves D are so arranged that they can be moved transversely or rotated on the pipes $a$, and may be held in place by frictional contact, as illustrated, or by means of sleeves formed on the pipes, as indicated at $x$, Fig. 3, or by extending the ends of the sleeves to meet the inner surfaces of the end walls, $c^2$, of the boxes, as shown at $y$ in said last-named figure. The sleeves D are also provided with one or more openings, $d'$, for the passage of and support for the tapped or branched conductors $a'$, as indicated in Fig. 4.

The open sections of the sleeves D and pipes $a$ provide for uncovering a portion of the latter in the boxes C when the sleeves are rotated to admit of easy access to the line-conductors for tapping purposes, and this uncovering of pipes $a$ is shown more plainly in Fig. 5.

The operation of tapping is substantially as follows: Access to the proper box C is first made by digging up the earth or ground above it and removing lid $c'$. The pipe containing the branch conductor $a'$, which pipe is shown at $f$ in the drawings, is then passed or secured into one of the box-openings $c^5$. The sleeve of the proper line-pipe $a$ is then turned to uncover the conductors therein, and the branch conductor is then passed through one of the openings $d'$ of the said sleeve and connected to the desired line conductor, whereupon said sleeve D is reversely rotated to cover or seal said pipe $a$. The cover or lid $c'$ is placed upon the tapping-box C and the earth filled in. In this way the line-conductors can be easily tapped for any purpose in an economical manner at any desired point along their length.

I do not limit my invention to conduits, as it is evident that the same may be applied to lead-covered cables or other like conductors.

If desired, wax or other like removable cement may be placed around the meeting edges of the sleeves D, to seal the conductor-pipes $a$ at their open sections $a^2$.

What I claim is—

1. In an underground system of electric lines, the rectangular tapping-box C, having a removable cover, $c'$, lateral openings $c^4$, admitting main pipes A, and end openings, $c^5$, admitting branch pipes $f$, in combination with open-section pipes A, provided with open section sleeves D, perforated so that wires may pass from the main pipes into the branch pipes, substantially as shown and described.

2. In an underground system of electric lines, the combination, with tapping-boxes C, of line-pipes $a$, having open sections $a^2$, and provided with rotating open-section sleeves D, whose length equals the width of the box, substantially as shown and described.

In testimony whereof I affix my signature in presence of two witnesses.

WILLIAM B. ROGERS.

Witnesses:
JOHN RODGERS,
S. J. VAN STAVOREN.